(12) United States Patent
Jin

(10) Patent No.: US 10,295,032 B2
(45) Date of Patent: May 21, 2019

(54) PRECISION ROTATIONAL TRANSMISSION MECHANISM

(71) Applicant: Hengfengtai Precision Machinery Co., Ltd, Wenzhou (CN)

(72) Inventor: Lianghua Jin, Wenzhou (CN)

(73) Assignee: Hengfengtai Precision Machinery Co., Ltd, Wenzhou (CN)

( * ) Notice: Subject to any disclaimer, the term of this patent is extended or adjusted under 35 U.S.C. 154(b) by 69 days.

(21) Appl. No.: 15/494,523

(22) Filed: Apr. 23, 2017

(65) Prior Publication Data

US 2017/0227099 A1 Aug. 10, 2017

Related U.S. Application Data

(63) Continuation of application No. PCT/CN2015/071533, filed on Jan. 26, 2015.

(30) Foreign Application Priority Data

Oct. 24, 2014 (CN) .......................... 2015 1 0574588

(51) Int. Cl.
*F16H 1/32* (2006.01)
*F16H 37/04* (2006.01)

(52) U.S. Cl.
CPC ............. *F16H 37/041* (2013.01); *F16H 1/32* (2013.01); *F16H 1/321* (2013.01); *F16H 2001/323* (2013.01); *F16H 2001/325* (2013.01)

(58) Field of Classification Search
CPC ............. F16H 37/041; F16H 2001/323; F16H 2001/325; F16H 1/321

USPC .......................... 475/162, 163, 168, 178, 179
See application file for complete search history.

(56) References Cited

U.S. PATENT DOCUMENTS 7,604,559 B2 * 10/2009 Fujimoto ................... F16H 1/32
475/170
7,901,316 B2 * 3/2011 Tsurumi ..................... F16H 1/32
475/162
8,007,389 B2 * 8/2011 Yudate ............... G01R 31/2887
475/149

(Continued)

FOREIGN PATENT DOCUMENTS

DE 102015211678 A1 * 12/2015 ............... F16H 1/32

*Primary Examiner* — Roger L Pang
(74) *Attorney, Agent, or Firm* — W&K IP (Wayne & King)

(57) ABSTRACT

Disclosed is a precision rotational transmission mechanism, comprising a fixing support (1), wherein the fixing support (1) is provided with a rotational case (112), which is connected to an electric motor and is provided with a first transmission mechanism (1122), a second transmission mechanism (33) and an output member (19) therein, an end of the first transmission mechanism is connected to the electric motor, the other end is connected to the second transmission mechanism, and the second transmission mechanism drives the rotational case to rotate simultaneously via the output member. The transmission mechanism has a simple and compact structure, has a larger output shaft which has bigger rigidity and can output from two ends, has a lighter overall weight which is suitable for industrialization and mass production, has a large transmission ratio, high transmission efficiency, small return difference, strong carrying capacity, strong impact resistance capacity, and long service life.

12 Claims, 11 Drawing Sheets

(56) References Cited

U.S. PATENT DOCUMENTS

| | | | | |
|---|---|---|---|---|
| 8,015,891 | B2* | 9/2011 | Ogasawara | B60K 17/08 |
| | | | | 123/197.1 |
| 8,585,124 | B2* | 11/2013 | Oberle | F16H 37/041 |
| | | | | 296/106 |
| 8,905,886 | B2* | 12/2014 | Yoshida | F16H 1/32 |
| | | | | 277/625 |
| 2008/0078265 | A1* | 4/2008 | Shiozaki | F16H 63/18 |
| | | | | 74/473.12 |
| 2009/0045661 | A1* | 2/2009 | Stoessel | B60N 2/0232 |
| | | | | 297/284.4 |
| 2014/0296014 | A1* | 10/2014 | Mitsufuji | H02K 7/116 |
| | | | | 475/149 |
| 2018/0187752 | A1* | 7/2018 | Hsieh | F16H 1/32 |

* cited by examiner

PRECISION ROTATIONAL TRANSMISSION MECHANISM

CROSS-REFERENCE TO RELATED APPLICATIONS

This application is a continuation of International Patent Application No. PCT/CN2015/071533 with an international filing date of Jan. 26, 2015, designating the United States, now pending, and further claims priority benefits to Chinese Patent Application No, 201410574588.1 filed Oct. 24, 2014. The contents of all of the aforementioned applications, including any intervening amendments thereto, are incorporated herein by reference.

TECHNICAL FIELD

The present invention relates to a precision rotational transmission mechanism.

BACKGROUND

The existing precision rotational transmission mechanisms are widely used in the fields of solar power generation apparatuses, radar antenna positioning apparatuses and the like, and most of the precision rotational transmission mechanisms adopt gear pairs, ball screw pairs and other transmission forms. In order to satisfy a requirement of outputting a large enough torque, and consume power of a motor as low as possible, a total transmission ratio of a transmission apparatus needs to reach tens of thousands. To satisfy such a large transmission ratio, for gears, ball screws and other transmission forms, multi-stage transmission is required, and the number of single-stage meshing gear teeth must differ greatly to satisfy the large transmission ratio, thereby seriously affecting the service life of the gears and making a whole structure very complicated and huge. From use conditions, the gears, the ball screws and other transmission forms generally do not apply to conditions of very bad weather environments, such as a solar power transmission apparatus applied to a harsh field environment, in which the harsh field environment presents a tough test to precision of a second transmission mechanism and the service life of a transmission component. As a solar power generation tracking apparatus, little shaking of a heliostat may cause large deviation of reflected light, so high requirements are put forward to return difference of an output shaft of the transmission apparatus. The gear form mainly adopts adjustable small backlash gears or variable tooth thickness gears, but the single-stage transmission is relatively small, so it is difficult to satisfy overall design requirements of the large transmission ratio. Adjustment of a ball screw transmission clearance needs to increase a pre-tightening force, thereby increasing friction, reducing transmission efficiency, accelerating the friction of a screw, and shortening service life. The existing precision rotational transmission mechanism generally includes the second transmission mechanism, a vertical second transmission mechanism, a fixing support and a connecting part. Due to complicated structures and large volumes of the second transmission mechanism and the vertical second transmission mechanism, this inevitably results in a larger volume and a more complicated structure of an overall mechanism (e.g., the patent, with an application number of 200980132680.X and titled 'a gear transmission apparatus and a solar power generation apparatus using the same', discloses a precision rotational transmission mechanism adopting gear transmission, but a driving shaft of the precision rotational transmission mechanism adopts the gear transmission, and an output end is just a shaft 110 end; thus, a cross-sectional area of the output shaft is just a small part of the apparatus, thereby resulting in insufficient rigidity, weak impact resistance and short service life.).

SUMMARY

In order to overcome shortcomings in the background, the present invention provides a precision rotational transmission mechanism, and mainly solves problems of complicated structure, low transmission efficiency, smaller output shaft with insufficient rigidity, weak bearing capacity and impact resistance, and short service life of the existing precision rotational transmission mechanism.

The present invention adopts a technical solution as follows:

The precision rotational transmission mechanism includes a fixing support, wherein the fixing support is provided with a rotational case; the rotational case rotates around an axis of the rotational case; output surfaces used for connection with a load are arranged on the rotational case; the rotational case is connected with a motor; a first transmission mechanism, a second transmission mechanism and an output member are arranged in the rotational case; one end of the first transmission mechanism is connected with the motor, and the other end is connected with the second transmission mechanism; and the second transmission mechanism drives the rotational case to rotate synchronously through the output member.

The second transmission mechanism includes an intermediate gear shaft, a planetary gear, an eccentric shaft, a cycloidal wheel and an inner gear ring; the intermediate gear shaft is meshed with the planetary gear; the planetary gear is fixedly connected with the eccentric shaft; the eccentric shaft is connected with the cycloidal wheel through a bearing; a plurality of pin shafts are uniformly distributed between the cycloidal wheel and the inner ring gear; and the cycloidal wheel drives the output member to perform rotational output through the pin shafts.

The output surfaces used for connection with the load are arranged at both ends of the rotational case.

The output member is mounted in the fixing support through thin-wall bearings.

A rotational bearing is arranged at the bottom of the rotational case; the rotational bearing includes a rotational bearing inner ring and a rotational bearing outer ring coordinated with each other in a sliding manner; first mounting holes are formed in the rotational bearing outer ring; second mounting holes adaptive to the first mounting holes are formed in the fixing support; and the first mounting holes are fixedly connected with the second mounting holes through screws.

The output member is adaptive to the planetary gear; and the rotational bearing inner ring is fixedly connected with the output member.

The output member is adaptive to the inner gear ring; and the rotational bearing inner ring is fixedly connected with the output member.

The first transmission mechanism includes a worm gear and a worm meshed with each other; and the worm is connected with the motor through a motor flange.

The first transmission mechanism includes a first bevel gear and a second bevel gear meshed with each other; and the first bevel gear is connected with the motor.

The first transmission mechanism further includes a worm gear and worm case; and the first bevel gear and the second bevel gear are connected with the motor through the worm gear and worm case.

The first transmission mechanism further includes a worm connecting shaft; and one end of the worm connecting shaft is connected with the worm, and the other end is connected with the motor.

The second transmission mechanism includes the intermediate gear shaft, the planetary gear, the eccentric shaft and a curve wheel; the worm gear is connected with the intermediate gear shaft through a spline; the intermediate gear shaft is meshed with the planetary gear; the planetary gear is fixedly connected with the eccentric shaft; the eccentric shaft is connected with the curve wheel through the bearing; a plurality of roller pins are uniformly distributed between the curve wheel and the inner gear ring; and the curve wheel drives the output member to perform rotational output through the roller pins.

The bearing is a bearing filled with rollers.

The first transmission mechanism further includes a motor flange and a worm connecting gear; a spline shaft is arranged on the motor; the spline shaft is connected with the worm connecting gear through the motor flange; and the worm connecting gear is connected with the worm connecting shaft.

The first transmission mechanism further includes a worm supporting base; the worm is mounted at one end of the worm supporting base; and the other end is mounted on an inner wall of the rotational case through the screw.

A rotational supporting outer ring and a rotational supporting inner ring adaptive to each other are further mounted on the fixing support; and the rotational supporting outer ring is fixedly mounted on the fixing support through the screw.

An inner gear ring is compounded on the inner wall of the rotational supporting outer ring; the output member is the inner gear ring; and an upper end of the inner gear ring is connected with the rotational case, and a lower end is fixedly connected with the inner gear ring.

The present invention has the advantages that the precision rotational transmission mechanism is provided and includes the rotational case arranged on the fixing support; the motor on the rotational case drives the second transmission mechanism to operate by driving the first transmission mechanism; the second transmission mechanism drives the rotational case to rotate by driving the output member; the output surfaces connected with the load are arranged on the rotational case; and the precision rotational transmission mechanism has the characteristics of compact, practical and simple structure, large output shaft with high rigidity, output from both ends, lighter overall weight, suitability for industrialized mass production, large transmission ratio, high transmission efficiency, small return difference, strong bearing capacity, strong impact resistance and long service life.

DETAILED DESCRIPTION

Figure 1:
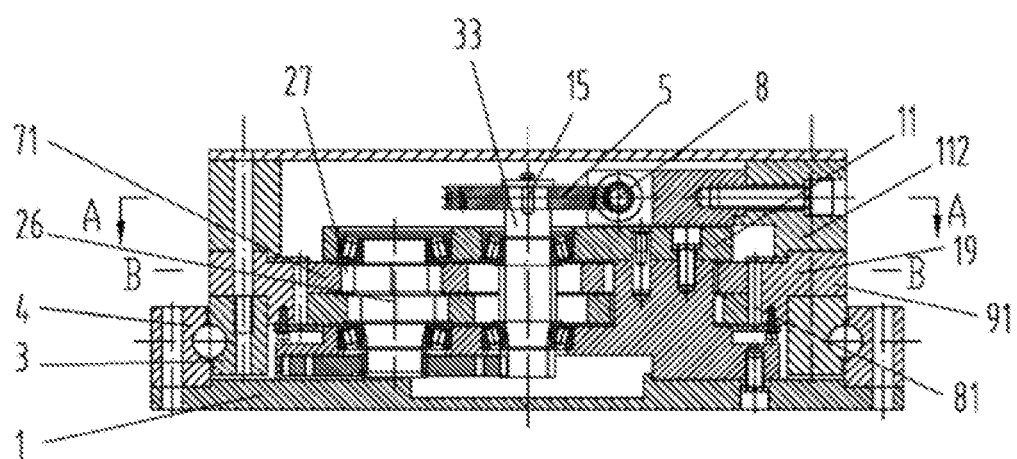
FIG. 1 is a partial sectional schematic diagram of one embodiment of the present invention.

The present invention is further explained in combination with drawings below: as shown in figures, a precision rotational transmission mechanism includes a fixing support 1; the fixing support 1 is provided with a rotational case 112; the rotational case 112 rotates around an axis of the rotational case 112; output surfaces 1121 used for connection with a load are arranged on the rotational case 112; the rotational case 112 is connected with a motor; a first transmission mechanism 1122, a second transmission mechanism 33 and an output member 19 are arranged in the rotational case 112; one end of the first transmission mechanism 1122 is connected with the motor, and the other end is connected with the second transmission mechanism 33; and the second transmission mechanism 33 drives the rotational case 112 to rotate synchronously through the output member 19. The motor is located on one side of a transmission apparatus and rotates together with rotation of the transmission apparatus. The present invention has the beneficial effects that the precision rotational transmission mechanism is provided and includes the rotational case arranged on the fixing support; the motor on the rotational case drives the second transmission mechanism to operate by driving the first transmission mechanism; the second transmission mechanism drives the rotational case to rotate by driving the output member; the output surfaces connected with the load are arranged on the rotational case; and the precision rotational transmission mechanism has the characteristics of compact, practical and simple structure, large output shaft with high rigidity, output from both ends, lighter overall weight, suitability for industrialized mass production, large transmission ratio, high transmission efficiency, small return difference, strong bearing capacity, strong impact resistance and long service life.

In the present invention, as shown in the figures, the output surfaces 1121 used for connection with the load are arranged at both ends of the rotational case 112, thereby outputting from both ends and achieving better practical effect.

In the present invention, as shown in the figures, the second transmission mechanism 33 includes an intermediate gear shaft 23, a planetary gear 30, an eccentric shaft 26, a cycloidal wheel 28 and an inner gear ring 20; the intermediate gear shaft 23 is meshed with the planetary gear 30; the planetary gear 30 is fixedly connected with the eccentric shaft 26; the eccentric shaft 26 is connected with the cycloidal wheel 28 through a bearing 27; a plurality of pin shafts 29 are uniformly distributed between the cycloidal wheel 28 and the inner ring gear 20; and the cycloidal wheel 28 drives the output member 19 to perform rotational output through the pin shafts 29. The motor performs transmission with a worm through a motor flange and also performs transmission through a worm gear and a worm; a worm gear 25 is connected with the intermediate gear shaft 23, to transmit an input to the intermediate gear shaft 23; the intermediate gear shaft 23 is meshed with the planetary gear 30, to transmit the input to an eccentric shaft 26 of a gear case; the eccentric shaft 26 is connected with the cycloidal wheel 28 through the bearing 27; the inner gear ring 20 is arranged on the outer periphery of the cycloidal wheel 28; the inner gear ring 20 is integrated with the fixing support 1; the inner gear ring 20 is arranged inside the fixing support 1; pin shafts 29 are uniformly distributed between the cycloidal wheel 28 and the inner gear ring 20; the output member 19 is positioned in the fixing support through thin-wall bearings 2; and the cycloidal wheel 28 drives the output member 19 to perform rotational output through the pin shafts 29. The motor is connected and fixed through the motor flange, and enables a motor shaft to be connected with the worm; the worm is combined with the worm gear; and the worm gear is fixedly connected with one end of the intermediate gear shaft 23. One end of the intermediate gear shaft 23 is spline; the spline is meshed with the planetary gear 30, so as to transmit the input to an eccentric mechanism. The planetary gear 30 is connected with the eccentric shaft 26; and an eccentric part on the eccentric shaft 26 is connected with the cycloidal wheel 28 through the bearing 27. The inner gear ring 20 is arranged on the outer periphery of the cycloidal wheel 28; and the pin shafts 29 are uniformly distributed between the inner ring gear 20 and the cycloidal wheel 28. The output member 19 is positioned in the fixing support 1 through the thin-wall bearings 2; on the premise of fixing the fixing support 1, the cycloidal wheel 28 uses the fixed fixing support 1 as a fulcrum to do eccentric motion and to push the pin shafts 20, while driving the output member 19 to do circular motion, thereby driving a workpiece such as a heliostat of a solar power generation apparatus to perform rotational positioning. In the precision rotational transmission mechanism, the transmission efficiency of a cylindrical gear is high; the cycloidal wheel, the pin shafts, the inner gear ring and a transmission frame have precision easy to be guaranteed and minimal output back clearance, adopt multi-point meshing output, have high output rigidity and strong impact resistance, and are particularly suitable for occasions of harsh weather environments. The motor is located on one side of the transmission apparatus, rotates together with the rotation of the transmission apparatus, and can realize the output from both ends of the transmission apparatus, thereby eliminating a drawback that the transmission apparatus can only input from one end and output from the other end, and more easily satisfying use requirements. The precision rotational transmission mechanism adopts a transmission mode of combining the worm gear-worm with a planetary few-tooth-difference cycloid, and has the characteristics of compact and practical structure, large transmission ratio, high transmission efficiency, small return difference, strong impact resistance and long service life.

In the present invention, as shown in the figures, the output member 19 is mounted in the fixing support 1 through the thin-wall bearings 2, so as to realize simple structure and good use effect.

In the present invention, as shown in the figures, the first transmission mechanism 1122 includes a worm gear 5 and a worm 8 meshed to each other; and the worm 8 is connected with the motor through a motor flange 7. This solution is a preferred solution, in which the worm and the worm gear can be self-locked, the use effect is good, the transmission ratio is large, the transmission efficiency is high, the return difference is small, and the impact resistance is strong.

In the present invention, as shown in the figures, the first transmission mechanism 1122 includes a first bevel gear 51 and a second bevel gear 52 meshed with each other; and the first bevel gear 51 is connected with the motor. Bevel gear transmission can also be adopted as an alternative solution.

Figure 2:
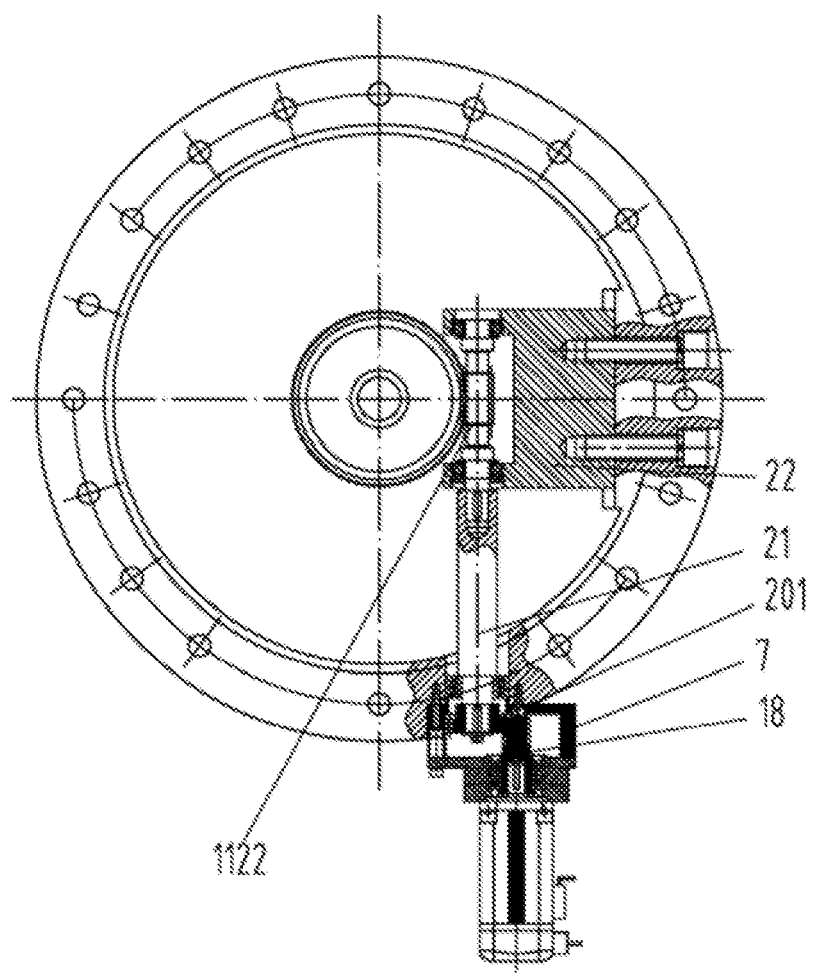
FIG. 2 is a partial sectional view along an axis A-A in FIG. 1.
Figure 3:
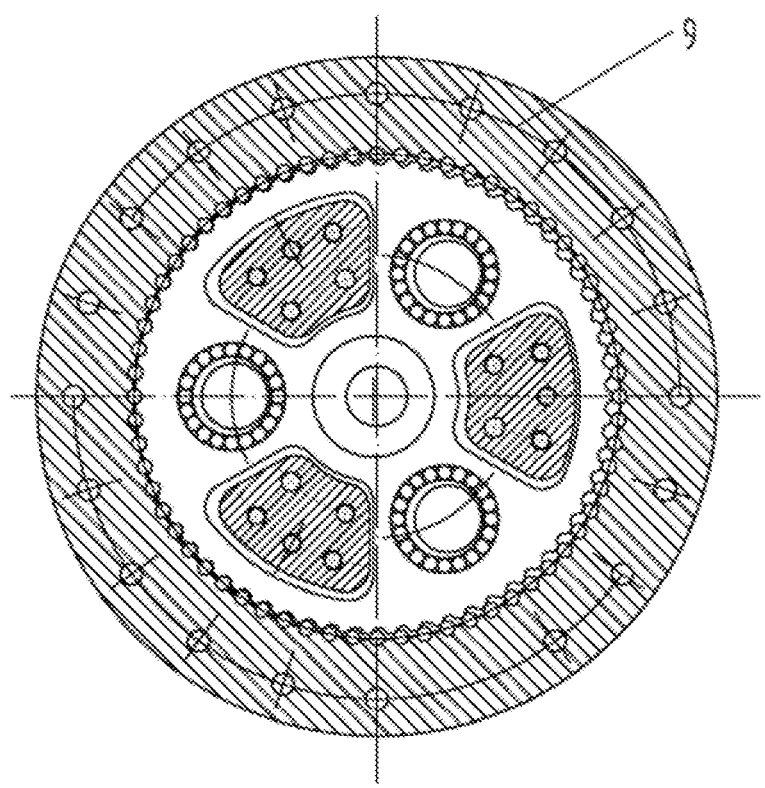
FIG. 3 is a sectional view along an axis B-B in FIG. 1.
Figure 4:
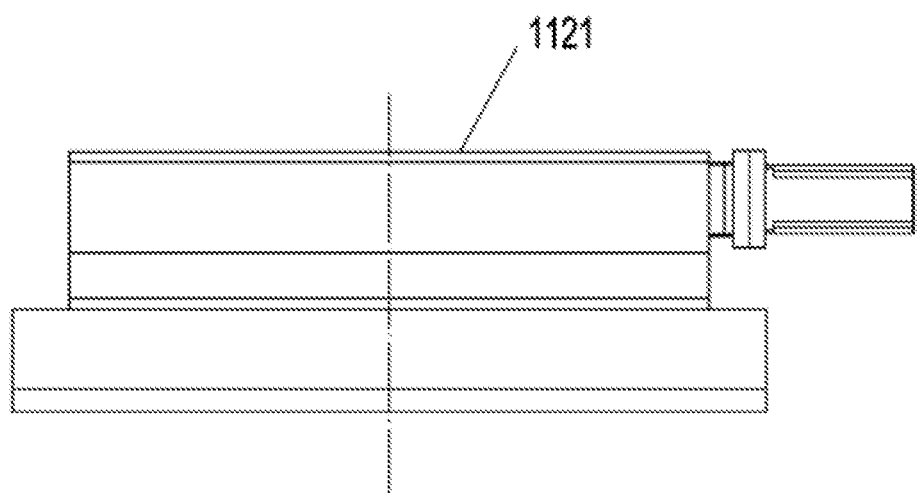
FIG. 4 is a front view of one embodiment of the present invention.
Figure 5:
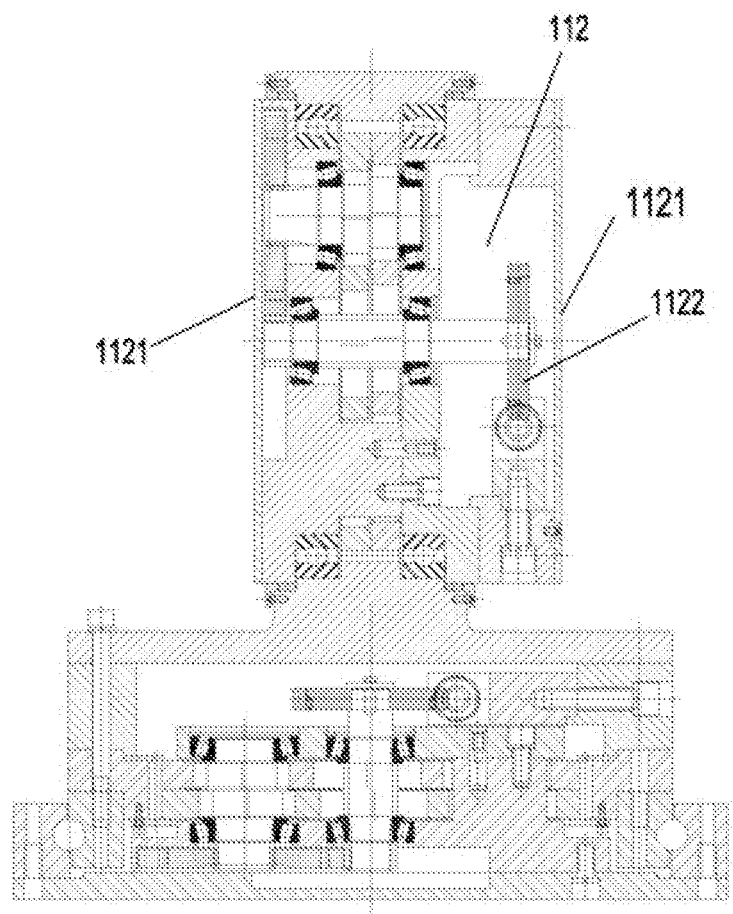
FIG. 5 is a sectional schematic diagram of one embodiment of the present invention.
Figure 6:
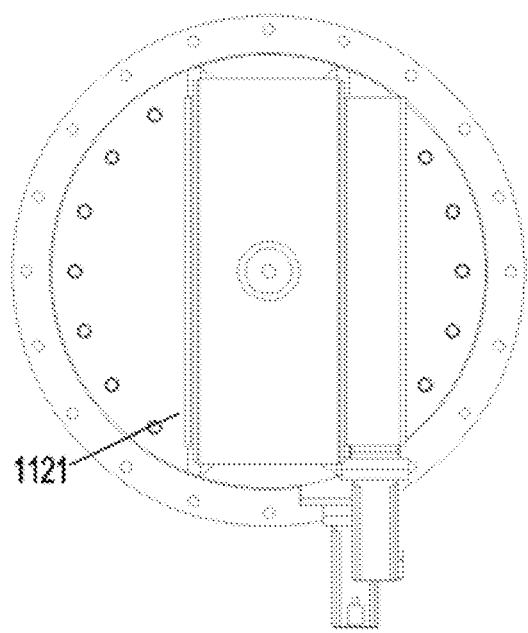
FIG. 6 is a top view of one embodiment of the present invention.
Figure 7:
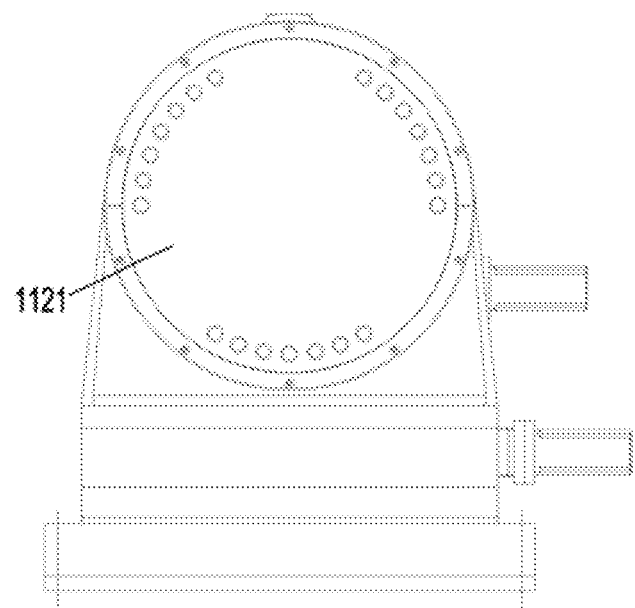
FIG. 7 is a left view of one embodiment of the present invention.
Figure 8:
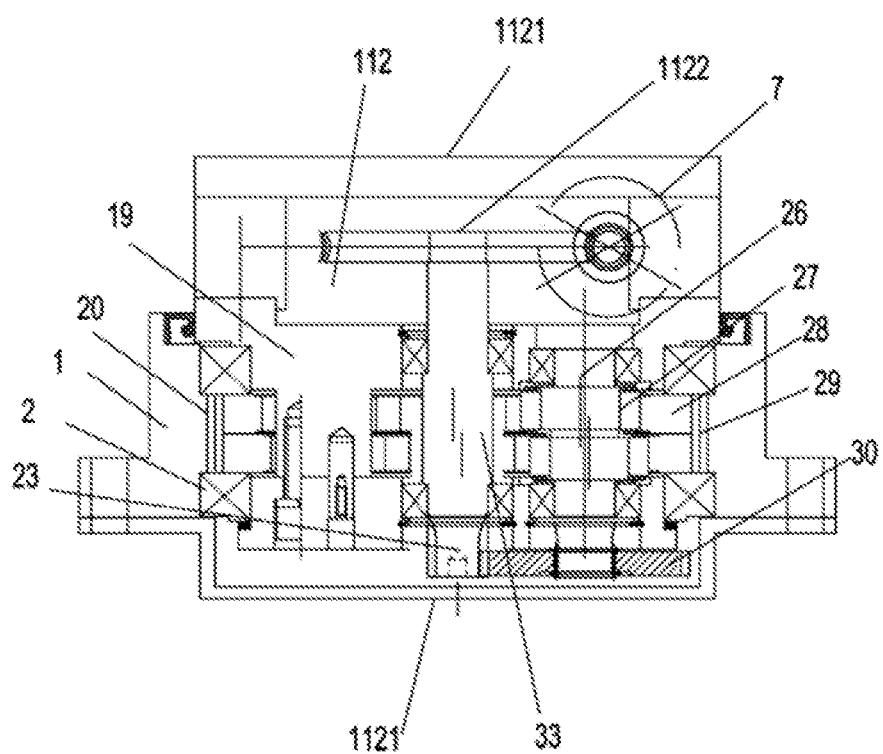
FIG. 8 is a sectional view of one embodiment of the present invention.
Figure 9:
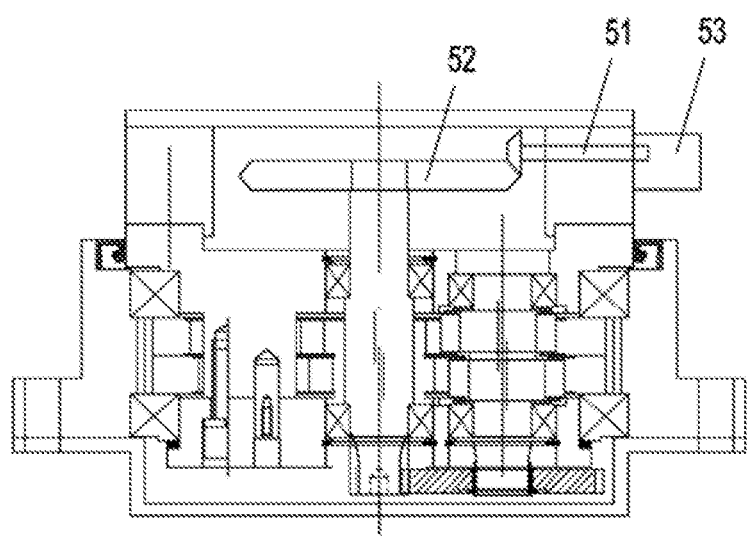
FIG. 9 is a sectional view of another embodiment of the present invention.
Figure 10:
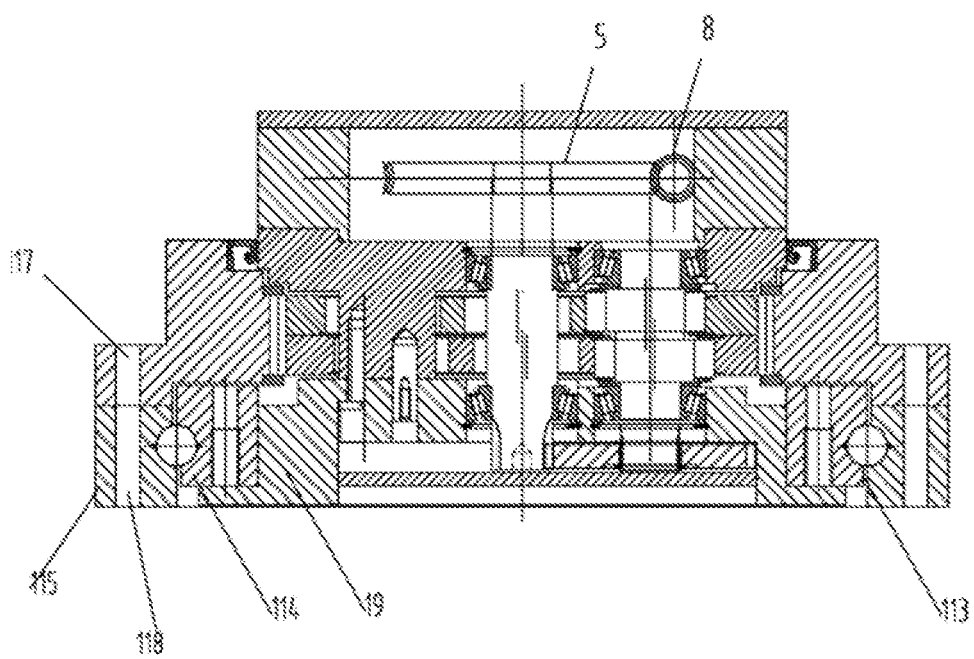
FIG. 10 is a sectional view of another embodiment of the present invention.
Figure 11:
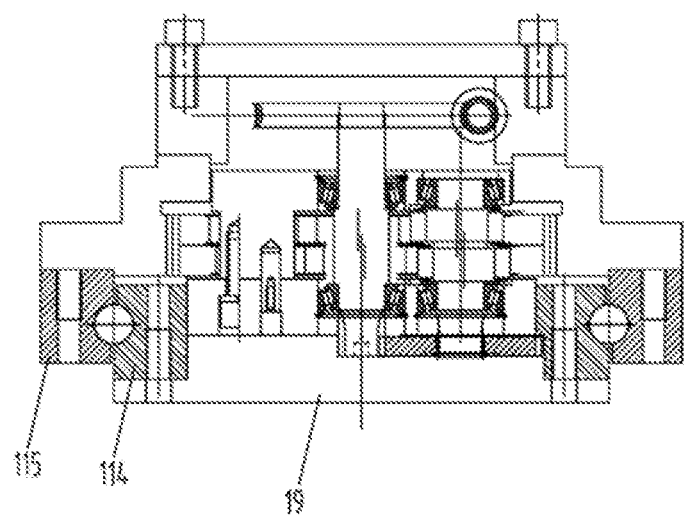
FIG. 11 is a partial sectional schematic diagram of another embodiment of the present invention.

In the present invention, as shown in FIG. 2, the precision rotational transmission mechanism further includes a worm gear and worm case 53; and the first bevel gear and the second bevel gear are connected with the motor through the worm gear and worm case 53. The bevel gears can be coordinated with the worm gear and worm case to realize a self-locking function, and are used in coordination with the alternative solution to realize better use effect. The structure can also be mounted on the second transmission mechanism shown in FIG. 3 and FIG. 4 to replace a structure of the worm gear and worm.

In the present invention, as shown in the figures, a rotational bearing 113 is arranged at the bottom of the rotational case 112; and the rotational bearing 113 includes a rotational bearing inner ring 114 and a rotational bearing outer ring 115 coordinated with each other in a sliding manner.

In the present invention, as shown in the figures, the output member 19 is adaptive to the planetary gear 30; and the rotational bearing inner ring 114 is fixedly connected with the output member 19, so as to realize simple structure and good use effect.

In the present invention, as shown in the figures, the output member 19 is adaptive to the inner gear ring 20; and the rotational bearing inner ring 114 is fixedly connected with the output member 19, so as to realize simple structure and good use effect.

In the present invention, as shown in the figures, first mounting holes 117 are formed in the rotational bearing outer ring 115; second mounting holes 118 adaptive to the first mounting holes 117 are formed in the fixing support 1; and the first mounting holes are fixedly connected with the second mounting holes through screws. When the rotational bearing inner ring is fixed, the rotational bearing outer ring can be rotated; and when the rotational bearing outer ring is fixed, the rotational bearing inner ring can be rotated.

In the present invention, as shown in the figures, the first transmission mechanism 1122 further includes a worm connecting shaft 21; and one end of the worm connecting shaft 21 is connected with the worm 5, and the other end is connected with the motor. The motor is located on one side of the transmission apparatus and rotates together with the rotation of the transmission apparatus; the rotational case is arranged on the fixing support; the motor on the rotational case drives the second transmission mechanism to operate by driving the first transmission mechanism; the second transmission mechanism drives the rotational case to rotate by driving the output member; the output surfaces connected with the load are arranged on the rotational case; and the precision rotational transmission mechanism has the characteristics of compact, practical and simple structure, large bearing surface of an output shaft with high rigidity, lighter overall weight, suitability for industrialized mass production, large transmission ratio, high transmission efficiency, small return difference, strong bearing capacity, strong impact resistance and long service life. In another aspect, the present invention uses a worm and worm gear as a first mechanism and includes the worm connecting shaft. When use, a motor external output spline shaft is connected with the worm connecting gear and one end of the worm connecting shaft, and the other end of the worm connecting shaft is connected with the worm through a spline, to realize long-distance connection of the motor and the worm, so that the transmission ratio can reach about tens of thousands. As an input part of a mechanism, the size of the worm gear and worm should not be too large. If the size of the worm gear and worm is too large, the mounting position of the worm may be closer to the outer side, thereby being inconvenient to mount and also weakening bearing strength; and too large size also brings the problems of increasing processing difficulty and increasing manufacturing cost. The worm connecting shaft is added to the mechanism, as a transition element to be connected with a motor output shaft, thereby greatly reducing the size of the worm, effectively improving the utilization rate of the worm, facilitating the processing of the worm and ensuring the processing accuracy of the worm. The present embodiment provides the precision rotational transmission mechanism including the rotational case arranged on the fixing support; the motor on the rotational case drives the second transmission mechanism to operate by driving the first transmission mechanism (i.e., the worm gear and worm mechanism); the second transmission mechanism drives the rotational case to rotate by driving the output member; the output surfaces connected with the load are arranged on the rotational case; thus, the precision rotational transmission mechanism has the characteristics of compact, practical and simple structure, large bearing surface of an output shaft, lighter overall weight, suitability for industrialized mass production, strong impact resistance and long service life. In addition, the worm connecting shaft is added to the first transmission mechanism, thereby shortening overall length of the worm, facilitating mounting and processing, and reducing production cost.

In the present invention, as shown in figures, the second transmission mechanism 33 includes the intermediate gear shaft 23, the planetary gear 30, the eccentric shaft 26 and a curve wheel 71; the worm gear 5 is connected with the intermediate gear shaft 23 through the spline; the intermediate gear shaft 23 is meshed with the planetary gear 30; the planetary gear 30 is fixedly connected with the eccentric shaft 26; the eccentric shaft 26 is connected with the curve wheel 71 through the bearing 27; a plurality of roller pins 81 are uniformly distributed between the curve wheel 71 and the inner gear ring 20; and the curve wheel 71 drives the output member 19 to perform rotational output through the roller pins 81. The worm is meshed with the worm gear; the worm gear is connected with the intermediate gear shaft through the spline; the other end of the intermediate gear shaft is the gear (i.e., a center gear); the center gear is meshed with the planetary gear; the planetary gear is fixedly connected with the eccentric shaft; the eccentric shaft rotates to drive the curve wheel to rotate; an outer ring of the curve wheel is meshed with inner sides of the roller pins; and outer sides of the roller pins are meshed with the inner gear ring. In the mechanism, a planetary carrier assembly is outputted as the output member through the inner gear ring. The inner gear ring is fixedly connected with a case body, so as to convert the input of the first transmission mechanism into the output of the second transmission mechanism, and realize precision transmission and simple structure.

In the present invention, as shown in figures, the bearing 27 is a bearing filled with rollers. The bearing filled with rollers is a bearing filled with cylindrical rollers. In the same width, compared with a traditional bearing with a cage, the bearing filled with rollers has extremely high bearing capacity and small radial cross-section, can save space, and has compact structure and good use effect. The bearing filled with rollers is adopted to realize stable and reliable bearing.

In the present invention, as shown in figures, the first transmission mechanism 1122 further includes a motor flange 7 and the worm connecting gear 201; a spline shaft 18 is arranged on the motor; the spline shaft 18 is connected with the worm connecting gear 201 through the motor flange 7; and the worm connecting gear 201 is connected with the worm connecting shaft 21. A motor external output spline shaft is connected with the worm connecting gear, the worm connecting shaft and other connecting parts through the motor output flange, so that motor input torque can be transmitted to the worm. The entire transmission mechanism has the transmission ratio up to one hundred thousand or more through multi-stage gear transmission, can satisfy conditions of high requirements for the transmission ratio, realizes simple structure, high transmission ratio and good use effect, and is a preferred solution.

In the present invention, as shown in figures, the precision rotational transmission mechanism further includes a worm supporting base 22; the worm 8 is mounted at one end of the worm supporting base 22; and the other end is mounted on an inner wall of the rotational case 112 through the screw. The worm is fixedly connected to the case body through the worm supporting base, so as to realize compact structure and easy manufacture and reduce manufacturing cost. In the present invention, as shown in figures, a rotational supporting outer ring 4 and a rotational supporting inner ring 3 adaptive to each other are further mounted on the fixing support 1; and the rotational supporting outer ring 4 is fixedly mounted on the fixing support 1 through the screw. The worm is fixedly connected to the case body through the worm supporting base, so as to realize compact structure and easy manufacture and reduce manufacturing cost.

In the present invention, as shown in figures, an inner gear ring 91 is compounded on the inner wall of the rotational supporting outer ring 4; the output member 19 is the inner gear ring 91; and an upper end of the inner gear ring 91 is connected with the rotational case 112, and a lower end is fixedly connected with the inner gear ring 91. A speed reduction transmission mechanism inside the mechanism is integrally compounded inside a rotational brace, so that the overall structure of the transmission mechanism is more compact and the volume is reduced. In a load aspect, after a torque is inputted from the motor, the inputted torque is transmitted to the inner gear ring through the worm gear and worm and planetary cycloid transmission; the inner gear ring is compounded inside the rotational brace, so as to transfer most of the load to the rotational brace; the rotational brace can bear very large load, thereby ensuring that the entire mechanism can bear larger load and impact, reducing the impact on an internal structure, and greatly improving the overall bearing capacity of the mechanism. Compared with a conventional structure that the inner gear ring is mounted on a pressure plate 11, the overall height of the mechanism is reduced; and when the mechanism bears tensile-compressive load and bending moment, since a distance between a force acting point and a supporting position is relatively short, the borne overturning moment is increased under certain strength.

Embodiments shall not be considered as a limitation to the present invention, but any improvement based on the spirit of the present invention shall be included in a protection scope of the present invention.

I claim:

1. A precision rotational transmission mechanism, comprising a fixing support (1), wherein the fixing support (1) is provided with a rotational case (112); the rotational case (112) rotates around an axis of the rotational case (112);

output surfaces (1121) used for connection with a load are arranged on the rotational case (112); the rotational case (112) is connected with a motor; a first transmission mechanism (1122), a second transmission mechanism (33) and an output member (19) are arranged in the rotational case (112); one end of the first transmission mechanism (1122) is connected with the motor, and the other end is connected with the second transmission mechanism (33); the second transmission mechanism (33) drives the rotational case (112) to rotate synchronously through the output member (19); the first transmission mechanism (1122) comprises a worm gear (5), a worm (8) meshed with the worm gear (5), a motor flange (7), a worm connecting shaft (21), and a worm connecting gear (201); the worm (8) is connected with the motor through the motor flange (7); one end of the worm connecting shaft (21) is connected with the worm (8), and the other end is connected with the motor; a spline shaft (18) is arranged on the motor; the spline shaft (18) is connected with the worm connecting gear (201) through the motor flange (7); and the worm connecting gear (201) is connected with the worm connecting shaft (21).

2. The precision rotational transmission mechanism according to claim 1, wherein the second transmission mechanism (33) comprises an intermediate gear shaft (23), a planetary gear (30), an eccentric shaft (26), a cycloidal wheel (28) and an inner gear ring (20); the intermediate gear shaft (23) is meshed with the planetary gear (30); the planetary gear (30) is fixedly connected with the eccentric shaft (26); the eccentric shaft (26) is connected with the cycloidal wheel (28) through a bearing (27); a plurality of pin shafts (29) are uniformly distributed between the cycloidal wheel (28) and the inner ring gear (20); and the cycloidal wheel (28) drives the output member (19) to perform rotational output through the pin shafts (29).

3. The precision rotational transmission mechanism according to claim 2, wherein the output surfaces (1121) used for connection with the load are arranged at both ends of the rotational case (112).

4. The precision rotational transmission mechanism according to claim 2, wherein the output member (9) is mounted in the fixing support (1) through thin-wall bearings (2).

5. The precision rotational transmission mechanism according to claim 3, wherein a rotational bearing (113) is arranged at the bottom of the rotational case (112); the rotational bearing (113) comprises a rotational bearing inner ring (114) and a rotational bearing outer ring (115) coordinated with each other in a sliding manner; first mounting holes (117) are formed in the rotational bearing outer ring (115); second mounting holes (118) adaptive to the first mounting holes (117) are formed in the fixing support (1); and the first mounting holes are fixedly connected with the second mounting holes through screws.

6. The precision rotational transmission mechanism according to claim 5, wherein the output member (19) is adaptive to the planetary gear (30); and the rotational bearing inner ring (114) is fixedly connected with the output member (19).

7. The precision rotational transmission mechanism according to claim 5, wherein the output member (19) is adaptive to the inner gear ring (20); and the rotational bearing inner ring (114) is fixedly connected with the output member (19).

8. The precision rotational transmission mechanism according to claim 1, wherein the second transmission mechanism (33) comprises an intermediate gear shaft (23), a planetary gear (30), an eccentric shaft (26) and a curve wheel (71); the worm gear (5) is connected with the intermediate gear shaft (23) through a spline; the intermediate gear shaft (23) is meshed with the planetary gear (30); the planetary gear (30) is fixedly connected with the eccentric shaft (26); the eccentric shaft (26) is connected with the curve wheel (71) through a bearing (27); a plurality of roller pins (81) are uniformly distributed between the curve wheel (71) and an inner gear ring (20); and the curve wheel (71) drives the output member (19) to perform rotational output through the roller pins (81).

9. The precision rotational transmission mechanism according to claim 8, wherein the bearing (27) is a bearing filled with rollers.

10. The precision rotational transmission mechanism according to claim 1, further comprising a worm supporting base (22), wherein the worm (8) is mounted at one end of the worm supporting base (22); and the other end is mounted on an inner wall of the rotational case (112) through a screw.

11. The precision rotational transmission mechanism according to claim 1, wherein a rotational supporting outer ring (4) and a rotational supporting inner ring (3) adaptive to each other are further mounted on the fixing support (1); and the rotational supporting outer ring (4) is fixedly mounted on the fixing support (1) through a screw.

12. The precision rotation& transmission mechanism according to claim 11 wherein an inner gear ring (91) is compounded on an inner wall of the rotational supporting outer ring (4); the output member (19) is the inner gear ring (91); and an upper end of the inner gear ring (91) is connected with the rotational case (112) and a lower end is fixedly connected with the inner gear ring (91).

\* \* \* \* \*